United States Patent
Weigel

(10) Patent No.: US 8,183,816 B2
(45) Date of Patent: May 22, 2012

(54) METHOD FOR FIELD-ORIENTED OPERATION TO ZERO SPEED OF AN ENCODER-LESS ASYNCHRONOUS MACHINE

(75) Inventor: Thilo Weigel, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 394 days.

(21) Appl. No.: 12/615,610

(22) Filed: Nov. 10, 2009

(65) Prior Publication Data

US 2010/0117587 A1    May 13, 2010

(30) Foreign Application Priority Data

Nov. 11, 2008 (DE) .......................... 10 2008 056 671
Nov. 24, 2008 (DE) .......................... 10 2008 058 739

(51) Int. Cl.
*H02P 27/04* (2006.01)
*H02P 23/00* (2006.01)
*H02P 6/00* (2006.01)
*H02P 21/00* (2006.01)
*H02P 25/00* (2006.01)

(52) U.S. Cl. .............. 318/801; 318/400.01; 318/400.02; 318/700; 318/727; 318/802; 318/803; 318/811; 318/813; 318/827

(58) Field of Classification Search ............. 318/400.01, 318/400.02, 700, 727, 801, 802, 803, 811, 318/813, 827
See application file for complete search history.

(56) References Cited

U.S. PATENT DOCUMENTS

| 4,447,787 | A  | * | 5/1984  | Schwesig et al. | 318/803 |
| 5,471,126 | A  | * | 11/1995 | Kono et al.     | 318/807 |
| 6,577,096 | B2 | * | 6/2003  | Cho             | 318/727 |
| 2003/0057912 | A1 | * | 3/2003 | Iwaji et al.    | 318/700 |
| 2009/0039810 | A1 | * | 2/2009 | Gotz et al.     | 318/400.32 |

FOREIGN PATENT DOCUMENTS

DE    102007003874 A1    2/2008

OTHER PUBLICATIONS

T. Kikuchi, Y. Matsumoto, H. Sugimoto Power Conversion Conference, Nagoya 2007, Apr. 2-5, 2007, pp. 839-844; Others: 2007: A Speed Sensodess Induction Motor Control Method using Adaptive Flux Observer Improving Stability Around Zero Frequency.

* cited by examiner

*Primary Examiner* — Walter Benson
*Assistant Examiner* — Gabriel Agared
(74) *Attorney, Agent, or Firm* — Henry M. Feiereisen; Ursula B. Day

(57) ABSTRACT

In a method for field-oriented operation to zero speed of an encoder-less asynchronous machine, wherein the associated field-oriented regulation device has a monitor with a machine model and rotation-speed adaptation, a model flux and a model current are calculated from a calculated actuating voltage and an adapted rotation speed, from which, in conjunction with a determined machine current, a complex difference is calculated. Also calculated is a model slip rotation speed as a function of the model flux and the model current, which is then scaled. The adapted rotation speed is then superimposed, and the sum is used as the rotation speed actual value which supplied to a rotation-speed regulator. An asynchronous machine without an encoder can therefore be operated to zero speed on a field-oriented basis.

8 Claims, 2 Drawing Sheets

METHOD FOR FIELD-ORIENTED OPERATION TO ZERO SPEED OF AN ENCODER-LESS ASYNCHRONOUS MACHINE

CROSS-REFERENCES TO RELATED APPLICATIONS

This application claims the priorities of German Patent Applications, Serial No. 10 2008 05 671.3, filed Nov. 11, 2008, and 10 2008 058 739.7, filed Nov. 24, 2008, pursuant to 35 U.S.C. 119(a)-(d), the contents of which are incorporated herein by reference in its entirety as if fully set forth herein.

BACKGROUND OF THE INVENTION

The invention relates to a method for field-oriented operation to zero speed of an encoder-less asynchronous machine, wherein the associated field-oriented regulation has a machine monitor with rotation-speed adaptation.

The following discussion of related art is provided to assist the reader in understanding the advantages of the invention, and is not to be construed as an admission that this related art is prior art to this invention.

Operation of an asynchronous machine without a rotation-speed encoder is of major importance for many industrial applications. In addition to cost saving reasons, this results in the advantage of installation reliability in the case of relatively high power installations, since, from experience, rotation encoders actually make a not insignificant contribution to the failure probability of the installation.

Because of the system characteristics of asynchronous machines, field-oriented operation without information about the measured rotation speed, at a low feed voltage frequency, is critical. Industrial applications in which operation at low frequency down to a frequency of zero plays an important role, are for example for the starting of very high inertias adjacent to the torque limit in the paper industry, in the case of centrifuges which are loaded and unloaded at low rotation speeds, for defined prestressing of a drive, for example when building up tension on spools in the steel industry or for extruders in the plastics industry, which have to produce a defined torque virtually at zero speed.

The problem to be solved technically and on which this invention is based is field-oriented operation of asynchronous machines without a rotary encoder down to the point where they are stationary "zero frequency", or down to the stationary zero-speed state, with the restriction that the load at low frequencies acts only reactively on the torque of the asynchronous machine. In the following text, a load such as this will be referred to as a passive load.

Solutions are therefore of particular technical interest which allow stable operation, without the use of sensors, for applications of this type.

In conventional field-oriented regulation devices, motor models use the stator variables "terminal voltage" and "motor current" of the asynchronous machine without a rotation-speed encoder to calculate the estimated information about the field orientation and the rotation speed of this asynchronous machine without the rotation-speed encoder. From the structural point of view, the motor model acts like a sensor which uses the electrical variables to provide the information about the field and the rotation speed of the asynchronous machine without a rotation-speed encoder to superordinate structures of the current regulation and rotation-speed regulation of a field-oriented regulation device.

Simple model versions using a forward structure such as the EMF model or the voltage model provide usable estimated variables up to about 10% of the motor rated frequency. More complex models, such as the machine monitor, in which a calculated model error reacts on the calculation of the estimated variables, achieve a minimum frequency, from experience, up to a factor of three times less.

The complete machine monitor with estimation of the rotation speed simulates the differential equations of the machine as realistically as possible, from the system point of view. Assuming exact model parameters, the expectation is therefore that the model structure will have the same stable rest point even at the frequency of zero. However, practical experiments have not confirmed this. Even after a short time, the model states current and flux diverge from one another in parallel but opposite directions. The model is entirely error-oriented with respect to the actual machine flux, and becomes unstable. Mapping errors of actual pulse-controlled inverters, measurement errors in the currents or possibly also in the measured voltage are effectively superimposed as error sources and are subject to a constant component at the "zero frequency" operating point. Since the control path has a bandpass characteristic at a stator frequency of zero, it is not possible to compensate for the constant component error, as a result of which the monitor is limit-stable. This means that errors from an indefinitely small constant component allow the system states to drift to the limit, inevitably, over time, with the consequence that the monitor becomes unstable.

For operation below the critical frequency, the rotation-speed estimation and therefore the rotation-speed regulation are switched off. When the frequency falls below a defined minimum, operation of the asynchronous machine without an encoder regulated on a field-oriented basis is disconnected, and a change is made from open-loop controlled operation. This means that the current magnitude and frequency are predetermined as fixed by a nominal-value source. Depending on the complexity, the change to and from this operating mode is more or less free of transience. However, this solution has the disadvantage that the drive can be operated with only restrictive dynamics at a relatively low frequency, and it is not possible to preset a defined torque.

Although the open-loop controlled method itself results in a major gain from the system engineering point of view, depending on the disconnection quality that is achieved, the serious disadvantage of loss of field orientation nevertheless remains. Furthermore, "open-loop controlled disconnection" results in considerable additional complexity.

DE 10 2007 003 874 A1 discloses a method for operation, without the use of an encoder, of a converter-fed asymmetric rotating-field machine, in particular of a permanent-magnet synchronous machine, by using a test signal. An estimated flux situation is continuously corrected by means of this test signal, which is fed into the rotating-field machine in the direction of a supposed flux axis of said rotating-field machine. In this known method, at least two alternating signals at a different frequency are preset at the same time as the test signal. These two alternating signals at different frequencies result in at least two different reactions, from which any discrepancy between an estimated flux situation and an actual flux situation of the rotating-field machine can then be determined with better accuracy.

The methods for operation, without an encoder, of a converter-fed rotating-field machine using a test signal are already in industrial use for permanent-magnet synchronous machines in which the rotor position is estimated. Unfortunately, this use is disproportionately more difficult for asynchronous machines without encoders due to the system characteristics.

Even this method with a test signal always requires an apparatus to generate a specific test signal. Furthermore, additional actions must be carried out in order to obtain information about the flux from reactions to one or more test signals.

The steady-state zero frequency point is a singular point with respect to the parameter "rotation speed". If the machine voltage is constant over time, the map of the rotation speed onto the machine current is a bandpass signal. At this point, it is therefore impossible to determine a steady-state rotation speed by measurement of machine voltages and machine currents.

Parameter errors of the motor model, mapping errors of a real pulse-controlled inverter of a voltage DC-link converter, and, depending on the current measurement method, more or less pronounced measurement noise are superimposed on this singular operating point and lead to the estimated variables "rotation speed" and "field orientation" being subject to considerable errors. If these variables are applied as supposed actual values to the cascaded structures of current regulation and rotation-speed regulation of a field-oriented regulation device, then this leads to uncontrolled stimuli in the actual torque and, in consequence, to movement of the motor shaft of the asynchronous machine without an encoder, or even to this asynchronous machine departing from the steady-state operating point.

It would therefore be desirable and advantageous to obviate prior art shortcomings by providing an improved method for field-oriented operation to zero speed of an asynchronous machine, wherein the asynchronous machine operates without an encoder.

SUMMARY OF THE INVENTION

According to one aspect of the present invention, a method for field oriented operation to zero speed of an encoder-less asynchronous machine includes the steps of calculating an actuating voltage and an adapted rotation speed, calculating a model flux and a model current from the calculated actuating voltage and adapted rotation speed, and calculating a complex difference for rotation speed adaptation as a function of the calculated variables model flux and model current and of a measured machine current. The calculated model current and the measured machine current are weighted and subtracted from one another, with the weighted current difference being projected onto the calculated model flux. The method further includes calculating from the calculated variables model flux and model current a model slip rotation speed, superimposing the adapted rotation speed and the calculated model slip rotation speed to form a sum signal representing the rotation speed actual value, and controlling the asynchronous machine with the sum signal.

The model slip rotation speed indicates an error at the operating point "stator frequency zero". This error can be compensated by subtracting the negative value of the model slip rotation speed from the adapted rotation speed. The sum of the adapted rotation speed and the calculated model slip rotation speed corresponds to the angular velocity of the model flux vector. The angular velocity is supplied to a rotation-speed regulator, allowing the regulator to control the rotation frequency of the model flux vector in spite of an error in the estimated rotation-speed value. This completely eliminates interfering but stable inherent movements of the motor shaft which occur even with rotation-speed regulation at a nominal value of zero, in spite of a calculation of a weighted projected current difference.

In order to determine an estimated rotation-speed value by means of a rotation-speed adaptation, this rotation-speed adaptation can be supplied with a complex difference, which is calculated as a function of the calculated model variables flux and current and of a measured machine current, wherein the calculated model current and the measured machine current are each weighted and subtracted from each other, and this weighted current difference is projected onto a calculated model flux. The weighted current difference which is projected onto the model flux makes the method according to the invention robust to actual disturbances, which are equivalent to an error with a constant component at the input of a PI regulator of the rotation-speed adaptation, since the bandpass characteristics of the control path of the rotation-speed adaptation loop at zero frequency is cancelled out in this way.

According to another advantageous feature of the present invention, the weightings of the model current and of the measured machine current, as well as the calculated model slip rotation speed, can be scaled by means of a monotonously decreasing scaling function before this calculated model slip rotation speed is superimposed on the adaptive rotation speed. This scaling process results in this weighting in the rotation-speed adaptation and the addition of the calculated model slip rotation speed gradually being reduced to the adapted rotation speed. Because of the scaling, the method according to the invention is effective only for a predetermined rotation-speed range that is greater than or equal to zero.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
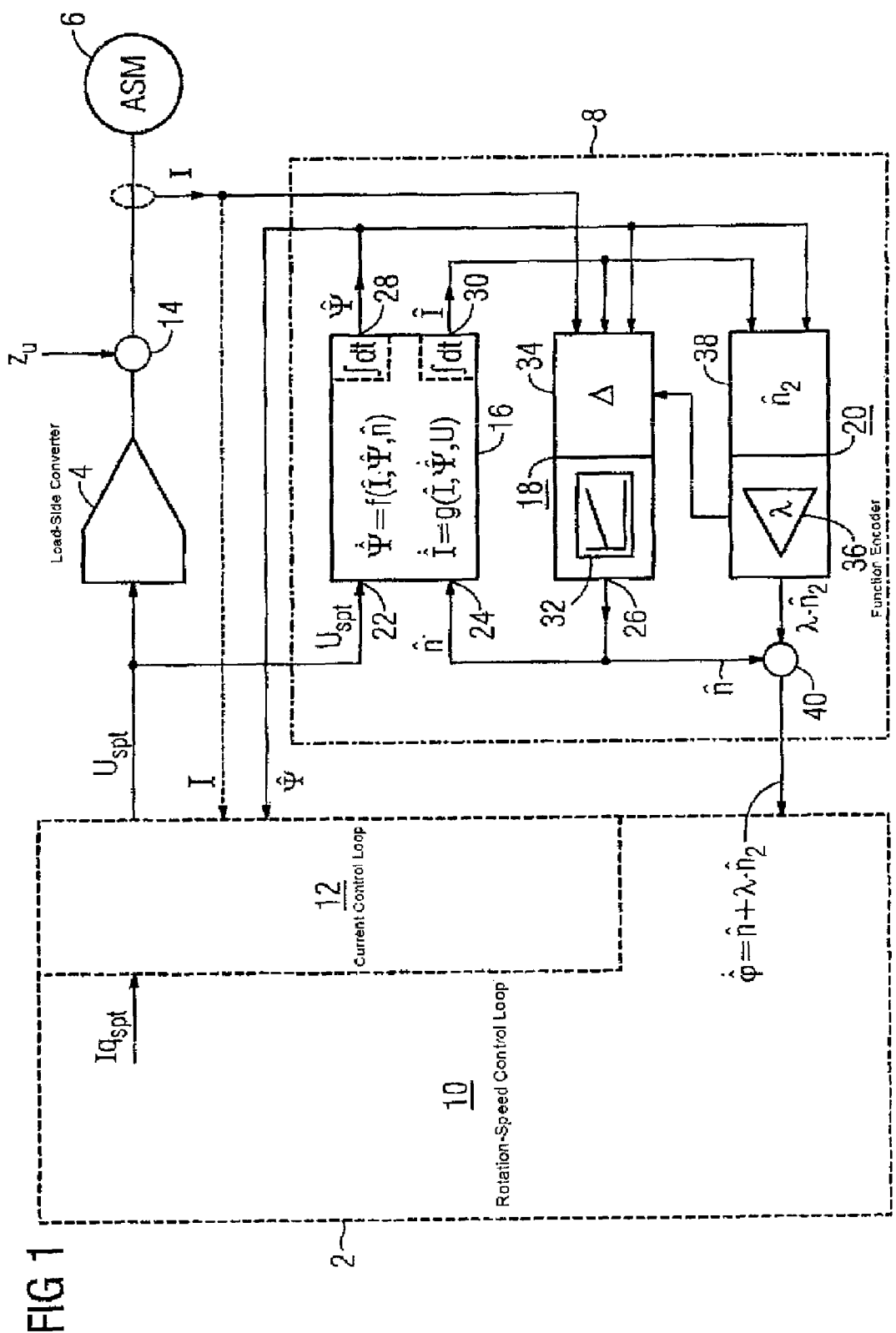
FIG. 1 shows one advantageous embodiment of a monitor structure according to the invention.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a field-oriented regulation device 2, a load-side converter 4 of a voltage DC-link converter which is not illustrated in more detail, an encoder-less asynchronous machine 6, and a monitor 8. The field-oriented regulation device 2 has a rotation-speed control loop 10 and a current control loop 12, with the current control loop 12 being subordinate to the rotation-speed control loop 10. This means that the output variable from the rotation-speed control loop 10 is a nominal value of a torque-forming current component $Iq_{spt}$ of a machine-current space vector. On the output side, the current control loop 12 is linked to the load-side converter 4, for example to a self-commutated pulse-controlled converter, which has a modulator and a control device on the input side. This illustration shows an actual load-side converter 4 as an ideal power amplifier, on which a disturbance source 14 is superimposed which adds low-frequency disturbance levels $z_u$ to a constant component which is also permissible. Two measurement devices, which are not illustrated in detail, are used to measure two machine currents, which represent a machine-current space vector I. These two measured machine currents are also supplied as actual values to the current control loop 12. This illustration shows the associated machine-current space vector I.

The monitor 8 has a machine model 16, rotation-speed adaptation unit 18 and rotation-speed actual-value error compensation unit 20. A determined voltage manipulated variable $U_{spt}$ of the field-oriented regulation device 2 is applied to the first input 22 of the machine model 16. This machine model 16 has the state equations of an asynchronous machine. A second input 24 of this machine model 16 is linked to an output 26 of the rotation-speed adaptation unit 18. The two outputs 28 and 30 of the machine model 16 are linked on the one hand to inputs of the rotation-speed adaptation unit 18 and on the other hand to inputs of the rotation-speed actual-value error compensation unit 20. A model flux $\hat{\Psi}$, in particular the rotor flux, is produced at the output 28 of this machine model 16, which is likewise linked to the subordinate current control loop 12 of the field-oriented regulation device 2. A model current $\hat{I}$ of the machine current of the asynchronous machine 6 is produced at the output 30 of the machine model 16.

Figure 2:
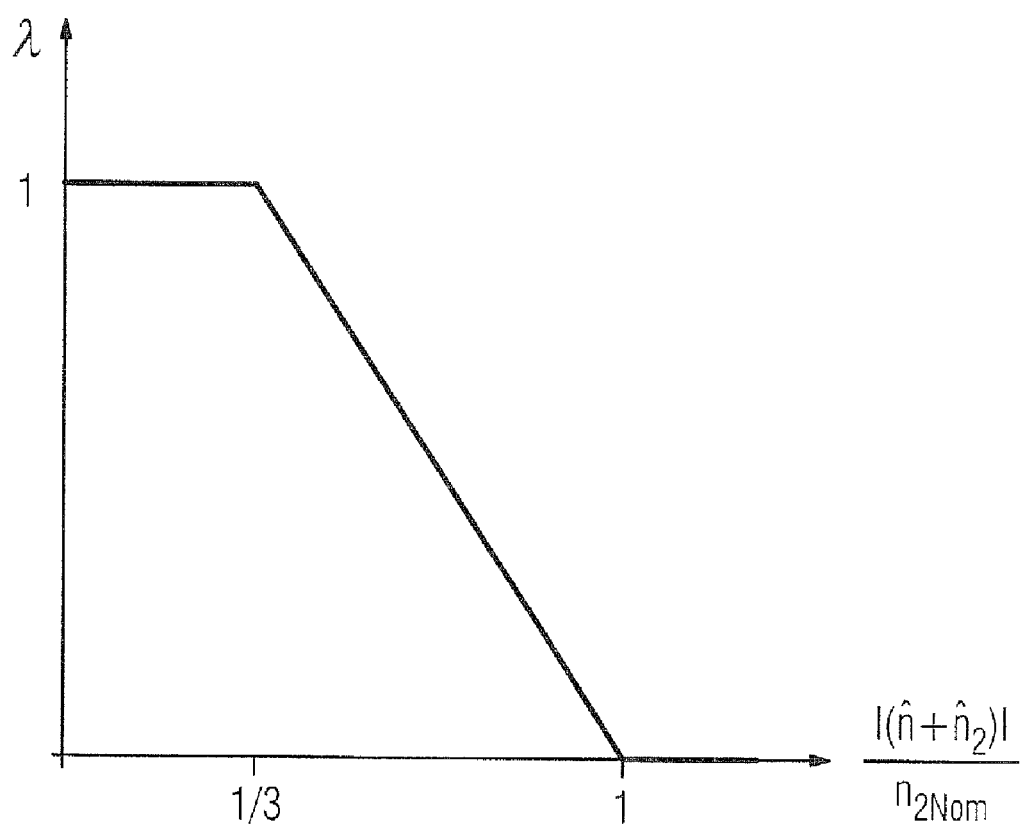
FIG. 2 shows a schematic diagram of a scaling function.

The rotation-speed adaptation unit 18 has a PI regulator 32 on the output side and a device 34 on the input side in order to calculate a complex difference $\Delta$. In order to allow a complex difference $\Delta$ to be calculated, this device 34 is supplied with a determined machine current I, a model current $\hat{I}$ and a model flux $\hat{\Psi}$. The downstream PI regulator 32 changes a model rotation speed $\hat{n}$ such that the discrepancy $\Delta$ which was initially present tends to zero. This complex difference $\Delta$ is calculated using the following equation:

$$\Delta = \mathrm{Im}\left[\frac{a\hat{I} - bI}{\hat{\Psi}}\right]$$

where a>b, and where a and b each represent a weighting factor. Only the imaginary component of this quotient of the weighted difference between the model current $\hat{I}$ and the machine current I and the model flux is used. The imaginary part corresponds to the vertical projection of the weighted current difference onto the model flux $\hat{\Psi}$. By means of this device 34, errors in the constant component of the rotation-speed estimated value $\hat{n}$, which is amplified by the control path, appear at the input of the PI regulator 32, thus cancelling out the bandpass characteristics of the control path of the rotation-speed adaptation loop at the zero frequency point. The weighting factors a and b are calculated using the following equations:

$a = 1 + \lambda \cdot K$ $b = 1 - \lambda \cdot K$ where $\lambda$ represents a value of a scaling function, which is predetermined in FIG. 2, and K represents a constant. Since the scaling function, as shown in the diagram in FIG. 2, has at least one monotonously decreasing branch, the weighting factors a and b are unity as the mechanical angular velocity $\hat{\phi}$ of the model flux vector $\hat{\Psi}$ increases, which is always the sum of the model rotation speed $\hat{n}$ and the estimated slip rotation speed $\hat{n}_2$. This means that the weighted difference between the model current $\hat{I}$ and the machine current I is effective only for a predetermined rotation-speed range that is greater than or equal to zero. As soon as the weighting factors a and b are each unity, the simple current difference is used to determine any rotation-speed discrepancy $\Delta$.

The rotation-speed actual-value error compensation unit 20 has a function encoder 36 on the output side and a device 38 on the input side for calculating an estimated slip rotation speed $\hat{n}_2$. A model slip rotation speed $\hat{n}_2$ is calculated by means of the device 38, at whose two inputs a model current $\hat{I}$ and a model flux $\hat{\Psi}$ are applied. For this purpose, the following equation is stored in this device 38:

$$\hat{n}_2 = \frac{\hat{R}_R}{z_p} \cdot \mathrm{Im}\left[\frac{\hat{I}}{\hat{\Psi}}\right]$$

where $z_P$ = number of rotor poles,
$\hat{R}_R$ = rotor resistance,
$\hat{\Psi}$ = model flux, and
$\hat{I}$ = model current.

This calculated model slip rotation speed $\hat{n}_2$ is scaled by means of the downstream function encoder 36. For this purpose, this function encoder 36 has the scaling function illustrated in FIG. 2. Since this scaling function has at least one monotonously decreasing branch, the calculated model slip rotation speed $\hat{n}_2$ is effective only for a predetermined rotation-speed range greater than or equal to zero. This range ends as soon as the magnitude of the sum of the model rotation speed $\hat{n}$ and the model slip rotation speed $\hat{n}_2$ just corresponds to the motor rated slip rotation speed $n_{2nom}$ of the asynchronous machine 8. The model rotation speed $\hat{n}$ of the rotation-speed adaptation unit 18, which is subject to errors, and the scaled model slip rotation speed $\hat{n}_2$ are superimposed on one another by means of an adder 40. The sum of the model rotation speed $\hat{n}$ and the scaled model slip rotation speed $\hat{n}_2$ is produced at the output of this adder 40, and is the angular velocity $\hat{\phi}$ of the model flux vector $\hat{\Psi}$. As a result of this superimposition of the model rotation speed $\hat{n}$, which is subject to errors, with the model slip rotation speed $\hat{n}_2$ at the input of the rotation-speed control loop 10, this rotation-speed control loop 10 controls the rotation frequency of the model flux vector in response to an error in the estimated rotation speed $\hat{n}$. Intrinsic movements of the motor shaft, which are disturbing but stable and which still occur when using the weighted projection at the nominal rotation-speed value zero, are overcome in this way.

The method according to the invention uses a model slip rotation speed $\hat{n}_2$ to compensate for an error in a model rotation speed $\hat{n}$ which is subject to errors. This results in a method which is robust against mapping errors of the load-side converter 4, maintains the control loop for rotation-speed estimation down to the stationary frequency zero point, subject to a restriction to passive loads, and provides usable estimated values for the "rotation speed" and "field orientation" to the cascaded structures of the current control loop 12 and rotation-speed control loop 10. It is therefore possible to continue completely regulated operation with an active rotation-speed control loop down to the frequency zero point, or zero speed. There is no need for the asynchronous machine 6 without an encoder to be operated with open-loop frequency control or open-loop current-magnitude control.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for field-oriented operation to zero speed of an encoder-less asynchronous machine, comprising the steps of:
    calculating an actuating voltage and an adapted rotation speed,
    calculating a model flux and a model current from the calculated actuating voltage and adapted rotation speed,
    calculating a complex difference for a rotation-speed adaptation as a function of the calculated variables model flux and model current and of a measured machine current, wherein the calculated model current and the measured machine current are weighted and subtracted from one another, with the weighted current difference being projected onto the calculated model flux,
    calculating from the calculated variables model flux and model current a model slip rotation speed,
    superimposing the adapted rotation speed and the calculated model slip rotation speed to form a sum signal representing the rotation speed actual value, and
    controlling the asynchronous machine with the sum signal.

2. The method as claimed in claim 1, wherein the weighted calculated model current and the weighted measured machine current are scaled.

3. The method as claimed in claim 1, further comprising the step of scaling the calculated model slip rotation speed before the adapted rotation speed is superimposed to form the sum signal.

4. The method as claimed in claim 2, wherein the weighted calculated model current and the weighted measured machine current are scaled with a monotonously decreasing function.

5. The method as claimed in claim 3, wherein the calculated model slip rotation speed is scaled with a monotonously decreasing function.

6. The method as claimed in claim 2, wherein the complex difference is calculated using the following equation:

$$\Delta = \operatorname{Im}\left[\frac{a\hat{I} - bI}{\hat{\Psi}}\right]$$

wherein
$\hat{I}$=model current,
$I$=determined machine current,
$\hat{\Psi}$=model flux,
a=weighting factor,
b=weighting factor, and
Im=imaginary part of a quantity.

7. The method as claimed in claim 6, wherein the weighting factors a and b are scaled using the following equations:

$$a = 1 + \lambda \cdot K$$

$$b = 1 - \lambda \cdot K$$

wherein a is greater than b, and
K=constant, and
λ=scaling value.

8. The method as claimed in claim 1, wherein the model slip rotation speed is calculated using the following equation:

$$\hat{n}_2 = \frac{\hat{R}_R}{z_P} \cdot \operatorname{Im}\left[\frac{\hat{I}}{\hat{\Psi}}\right]$$

wherein
$\hat{n}_2$=model slip rotation speed,
$\hat{I}$=model current,
$\hat{\Psi}$=model flux,
$z_P$=number of rotor poles,
$\hat{R}_R$=rotor resistance, and
Im=imaginary part of a quantity.

* * * * *